United States Patent
Wang

(10) Patent No.: US 9,313,484 B2
(45) Date of Patent: Apr. 12, 2016

(54) DISPLAY SYSTEM FOR AUTOMATIC DETECTION AND SWITCH OF 2D/3D DISPLAY MODES THEREOF

(71) Applicant: LIQUID3D SOLUTIONS LIMITED, Tsim Sha Tsui, Kowloon (HK)

(72) Inventor: Johnny Paul Zheng-Hao Wang, Pingzhen (TW)

(73) Assignee: LIQUID3D SOLUTIONS LIMITED, Tsim Sha Tsui, Kowloon (HK)

( * ) Notice: Subject to any disclaimer, the term of this patent is extended or adjusted under 35 U.S.C. 154(b) by 117 days.

(21) Appl. No.: 14/194,720

(22) Filed: Mar. 1, 2014

(65) Prior Publication Data

US 2015/0237337 A1    Aug. 20, 2015

(30) Foreign Application Priority Data

Feb. 19, 2014    (TW) .............................. 103105421 A

(51) Int. Cl.
*H04N 5/765* (2006.01)
*H04N 13/04* (2006.01)
*H04N 13/00* (2006.01)

(52) U.S. Cl.
CPC ........... *H04N 13/0454* (2013.01); *H04N 5/765* (2013.01); *H04N 13/0055* (2013.01); *H04N 2213/007* (2013.01)

(58) Field of Classification Search
CPC . H04N 5/00; H04N 13/0454; H04N 13/0055; H04N 13/016; H04N 21/44088
See application file for complete search history.

(56) References Cited

U.S. PATENT DOCUMENTS

| | | | | |
|---|---|---|---|---|
| 2010/0182404 A1* | 7/2010 | Kuno | ................. | G02B 27/2264 348/43 |
| 2011/0292170 A1* | 12/2011 | Jain | .................... | H04N 13/0438 348/43 |
| 2012/0268576 A1* | 10/2012 | Watanabe | .......... | H04N 13/0402 348/54 |

* cited by examiner

*Primary Examiner* — Huy T Nguyen
(74) *Attorney, Agent, or Firm* — Cheng-Ju Chiang

(57) ABSTRACT

A display system for automatic detection and switch of 2D/3D display modes thereof comprises a display device comprising a built-in display mode control chip, and a recording and playback device electrically connected to the display device. The recording and playback device comprises a built-in auto-detection software. The recording and playback device loads a playback data to be compared by the auto-detection software, and transmits a signal to the display mode control chip of the display device to achieve advantages of automatic detection and switching of 2D/3D display modes of the display device.

10 Claims, 4 Drawing Sheets

Left Image and Right Image Color Matching

Left Image and Right Image Color Matching

DISPLAY SYSTEM FOR AUTOMATIC DETECTION AND SWITCH OF 2D/3D DISPLAY MODES THEREOF

BACKGROUND OF THE INVENTION

1. Field of the Invention

The present invention relates to a display system with multiple display modes of two-dimensional (2D) and stereoscopic or auto-stereoscopic (two dimensional/three dimensional, 2D/3D) display modes, and defines a structural method to automatically detect which display mode to activate, by image analysis and processing of the incoming graphical image or video to be displayed.

2. The Related Arts

Because there is a proper distance between people's two eyes, viewing angles of these two eyes toward an image and video is not the same. As a result, after retinal images of left and right eyes are merged through the brain, people will be able to observe a 3 dimensional representation of an image and video. The phenomenon is fulfilled based on the principle of binocular disparity.

A stereoscopic image is an image that consists of a pair or multiple images set, with each image slightly offset or minor deviating from each other. The set of images can be constructed in many different alignments such as side-by-side, over/under, vertically interlaced, horizontally interlaced, multiple tiled (2×2, 3×3). A stereoscopic video is a video that is made up of stereoscopic images.

To present 3D stereoscopic images or videos through a display system technology, the display system will take the stereo image pair or multiple image sets and present stereoscopic images by spatially separating the stereoscopic image presentation such that the left eye and right eye will see the different image pairs or multiple images composed in the stereoscopic image. An example of display system technologies are polarized stereoscopic glasses, lenticular 3D lenses, and parallax barrier 3D lenses.

With reference to FIG. 1, a structural diagram of a conventional display system with 2D and 3D display modes is shown. The system includes a display device 100 having an integrated chip (IC) 110 embedded in the display system that is capable of controlling its display mode, and a recording and displayback device 200 electrically connected to the display device 100 through an image/video data transmission interface 300 that includes, but not limited to LVDS, HDMI, and DVI. The recording and displayback device 200 includes a central processing unit 2100 and a graphics-processing unit 2200. There are processing units that combine the central processing unit and the graphics-processing unit in one package. The central processing unit 2100 is electrically connected to the graphics-processing unit 2200. The recording and displayback device 200 loads the stereoscopic content data 230. With past display systems, the viewer(s) of the display system must manually select the display mode of the display system to the 3D display mode when playing back stereoscopic images or videos (The user is required to switch the display mode by a controller 400 or a control interface) which generates a poor user experience.

The disadvantage of a display system with 2D and 3D display modes without the capability of auto-detecting the proper display mode is that user must manually switch the display system.

In view of this, the inventors, based on years of experience in manufacturing of display systems, carefully studied and designed under many improving experiments in view of the above-mentioned disadvantage, and finally acquired the present invention with advantages of convenient and practical use for a 2D and 3D capable display system.

SUMMARY OF THE INVENTION

The main objective of the present invention is to provide a display system capable of automatic detection of a stereoscopic image and video and correspondingly switch a display mode of the display system from 2D to 3D and vice-versa in order to improve the problem of prior techniques.

The technical means adopted and used in the present invention for solving the problem of prior techniques is as follows. A display system for automatic detection and switching of 2D/3D display modes thereof comprises a display device and a recording and playback device. The display device comprises a built-in display mode control chip that is an integrated circuit (IC) capable of controlling the display modes. The recording and playback device is electrically connected to the display device, and comprises a central processing unit and a graphics-processing unit. The central processing unit is electrically connected to the graphics-processing unit and/or the central processing and graphics-processing units are packaged as a single processing unit, and the central processing unit comprises an auto-detection software. A stereo-matching algorithm and a communication protocol construct the auto-detection software. The recording and playback device loads a playback data to be compared by the auto-detection software, and transmits a signal to the display mode control chip of the display device.

In the embodiment of the present invention, the display device is selected from one of a liquid crystal display (LCD), a plasma display panel (PDP), and an organic light emitting diode (OLED) display that is capable of presenting 3D stereoscopic image and videos.

In the embodiment of the present invention, the recording and playback device is selected from one of a computer, a multimedia player, a smart phone, a tablet PC, and a digital camcorder.

In the embodiment of the present invention, the playback data is an image file or a graphic video file.

In the embodiment of the present invention, the central processing unit is equipped and/or connected with a data storage module. The playback data is read by the graphics-processing unit and the central processing unit and then sent to the auto-auto-detection software for image processing to determine whether the playback data is a stereoscopic image and/or video.

In the embodiment of the present invention, the data storage module is connected or embedded in the central processing unit.

In the embodiment of the present invention, the auto-auto-detection software compares the playback data using a stereo-matching image processing algorithm, and transmits the signal to the display mode control chip of the display device via the communication protocol.

In the embodiment of the present invention, when the auto-detection software compares the playback data to determine the playback data to be a 3D stereo format content, the auto-detection software transmits a signal to the display modes control chip of the display device in order to place the display device into its 3D display mode.

In the embodiment of the present invention, when the auto-detection software compares the playback data to determine the playback data to be a 2D plane format content, the auto-detection software transmits a signal to the display mode control chip of the display device in order to place the display device into its 2D display mode.

By the technical means adopted in the present invention, the display device comprises a display mode control chip that is an integrated circuit capable of controlling the display modes, and the recording and playback device is electrically connected to the display device. The recording and playback device comprises a built-in auto-detection software. The recording and playback device loads a playback data to be processed by the auto-detection software, and transmits a signal to the display mode control chip of the display device to achieve advantages of automatic detection and switching of 2D/3D display modes of the display device.

The physical embodiments adopted in the present invention will be presented by the following embodiments and accompanying drawings for further explanations.

DETAILED DESCRIPTION OF PREFERRED EMBODIMENT

Figure 1:
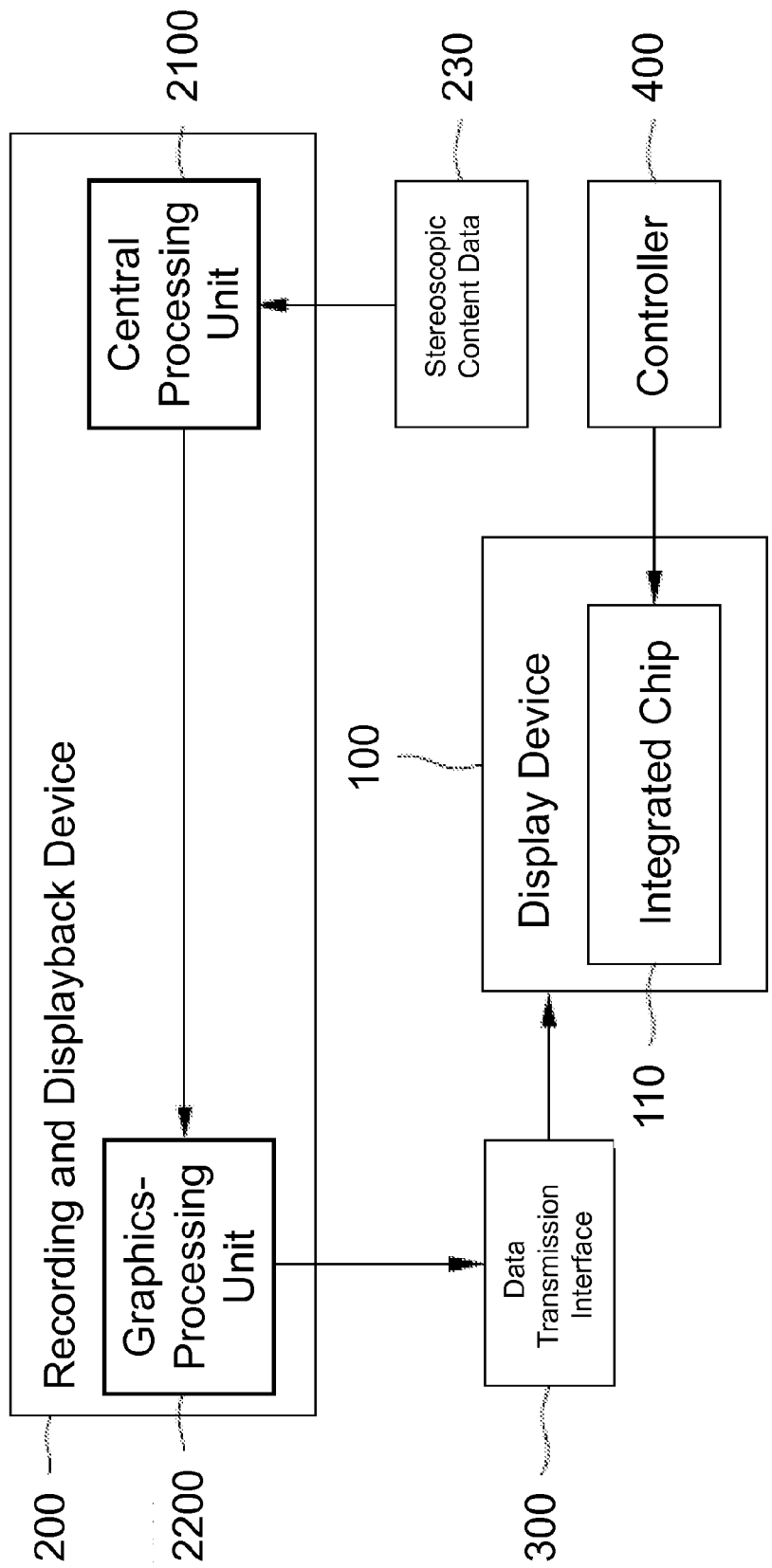
FIG. 1 shows a structural diagram of a traditional display system with 2D and 3D display modes.
Figure 2:
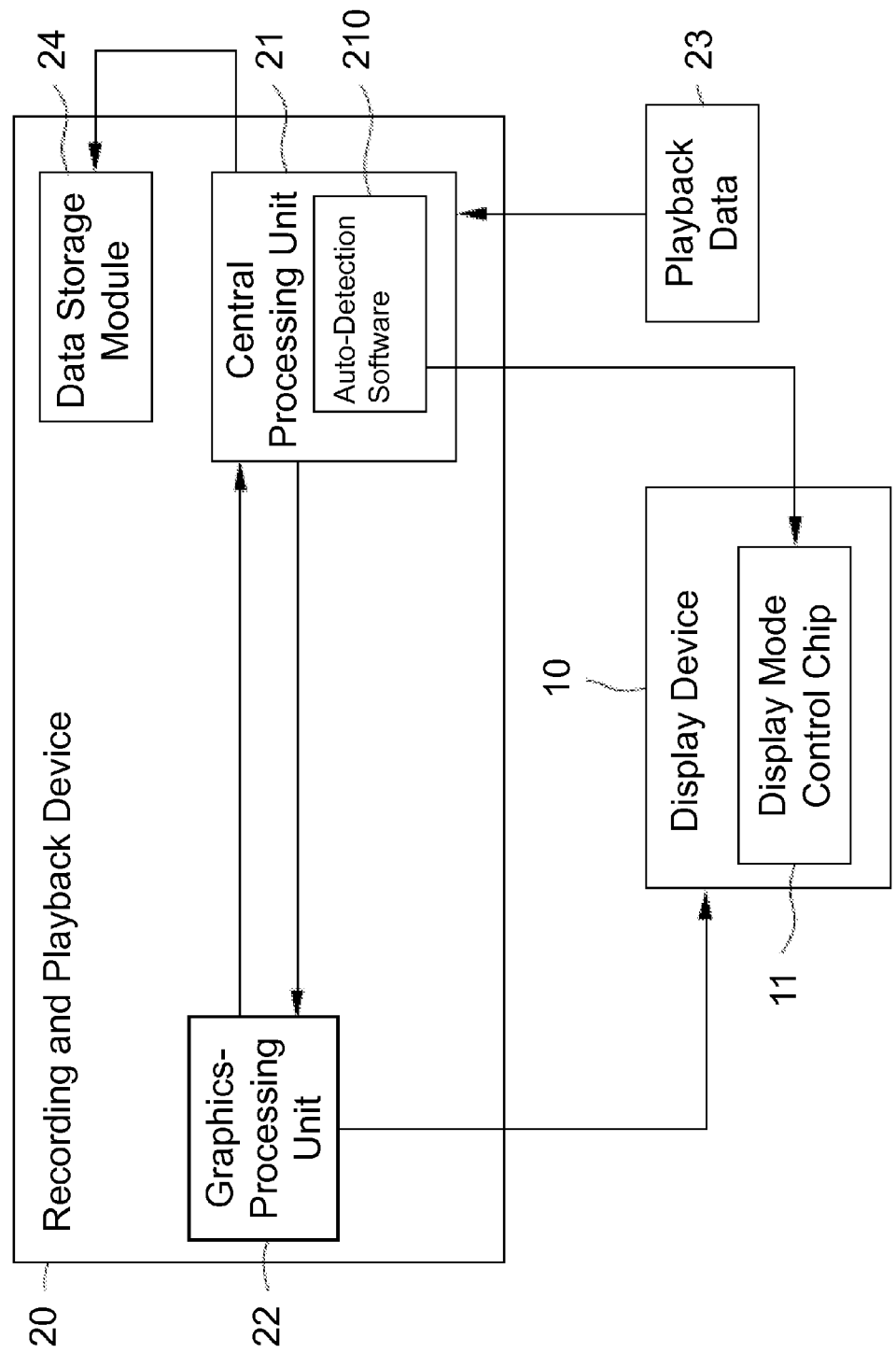
FIG. 2 shows a structural diagram of a display system for automatic detection and switching of 2D/3D display modes of the display system in accordance with the present invention.

With reference to FIG. 2, an embodiment of a display system for automatic detection and switch of 2D/3D display modes thereof in accordance with the present invention includes a display device 10, and a recording and playback device 20.

The display device 10 comprises an integrated circuit (IC) that is capable of controlling a display mode of the display system, i.e., a display mode control chip 11, and the display mode control chip 11 is used to control the display device 10 under a two-dimensional (2D) display mode thereof or a three-dimensional (3D) display mode thereof. In particular, the display device 10 can be selected from one of a liquid crystal display (LCD), a plasma display panel (PDP), and an organic light-emitting diode display (OLED display) that is capable of presenting 3D stereoscopic images and videos. In the embodiment, the display device 10 is selected from a liquid crystal display.

The recording and playback device 20 is electrically connected to the display device 10. The recording and playback device 20 can be selected from one of a computer, a multimedia player, a smart phone, a tablet PC, and a digital camcorder (DV). In this embodiment, the recording and playback device 20 is selected from a notebook computer, and is connected to the display device 10 through a data transmission cable. The recording and playback device 20 comprises a central processing unit (CPU) 21 and a graphics-processing unit (GPU) 22. The central processing unit 21 is electrically connected to the graphics-processing unit 22, and comprises a built-in auto-detection software 210. The auto-detection software 210 is constructed by a stereo-matching image processing algorithm and a communication protocol. The recording and playback device 20 is used to load a playback data 23. The playback data 23 is an image or video data file. The playback data is stored in either a portable or fixed storage device, and then loaded by the recording and playback device 20 to be processed by the auto-detection software 210. The auto-detection software 210 further transmits an electronic signal to the display mode control chip 11 of the display device 10 to determine the display mode of the display device 10 to be either 2D display mode or 3D display mode. In particular, the auto-detection software 210 compares the playback data 23 via the stereo-matching image processing algorithm, and transmits the signal to the display mode control chip 11 of the display device 10 via the communication protocol.

In the embodiment of the present invention, the central processing unit 21 is equipped and/or connected with a data storage module 24. The playback data 23 is read by the graphics-processing unit 22 and the central processing unit 21 and then sent to the auto-auto-detection software 210 for image processing to determine whether the playback data 23 is a stereoscopic image and/or video.

In particular, after the auto-detection software 210 compares the playback data 23 and determines the playback data 23 to be a 3D stereoscopic image or video, the auto-detection software 210 transmits a signal to the display mode control chip 11 of the display device 10 in order to place the display device 10 into the 3D display mode thereof. After the auto-detection software 210 compares the playback data 23 and determines the playback data 23 to be a 2D plane format content, the auto-detection software 210 transmits a signal to the display mode control chip 11 of the display device 10 in order to place the display device 10 into the 2D display mode thereof.

Figure 3:
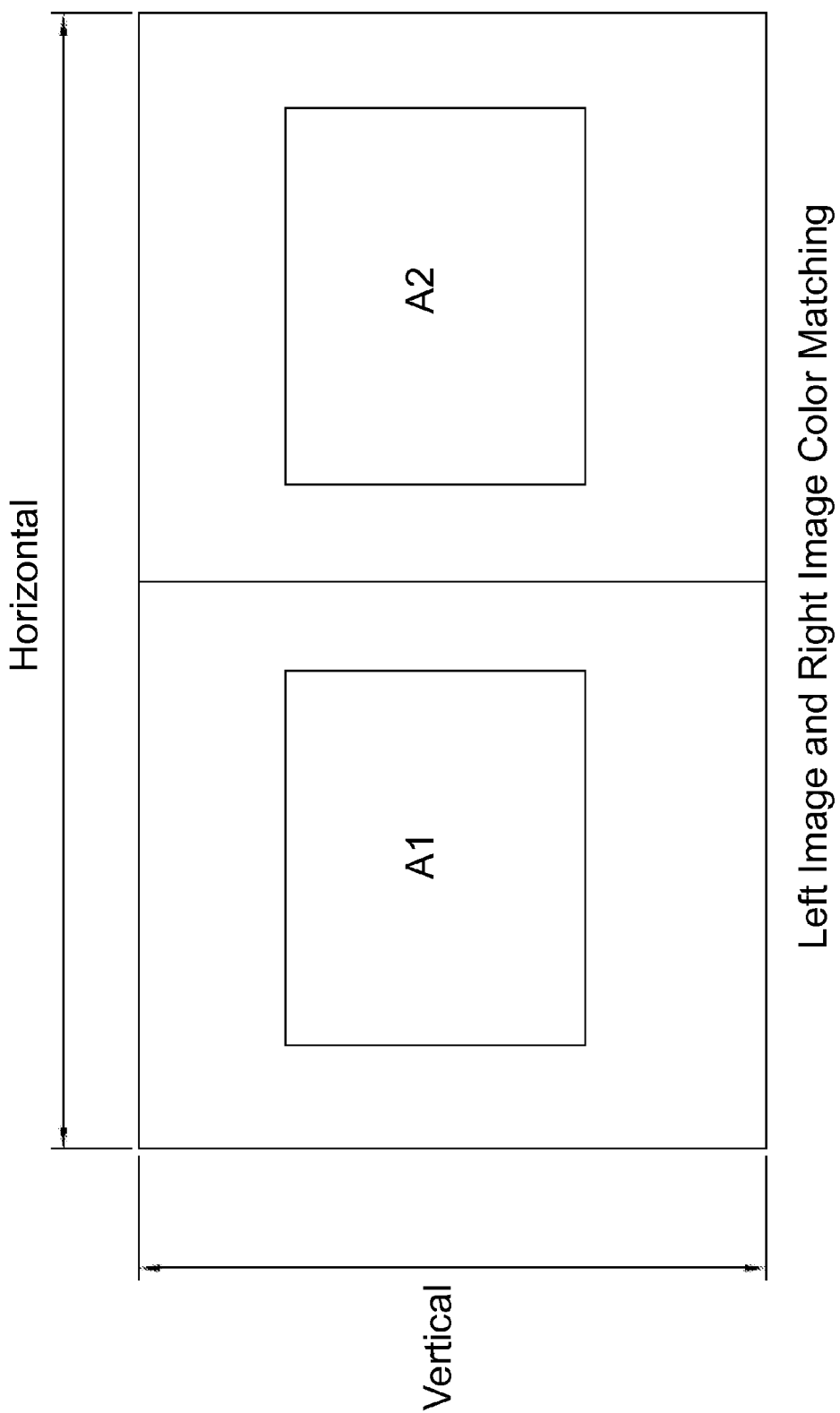
FIG. 3 shows a schematic diagram of an image that is presented in a side-by-side format in the form of left and right regions, wherein the scope of the left side of the image labeled A1 is the pixel subset of the image's left region, and the scope of the right side of the image labeled A2 is the pixel subset of the image's right region, and A1 and A2 is an example of portions of the image that is processed by the auto-detection software to determine whether the image is indeed a stereoscopic image.
Figure 4:
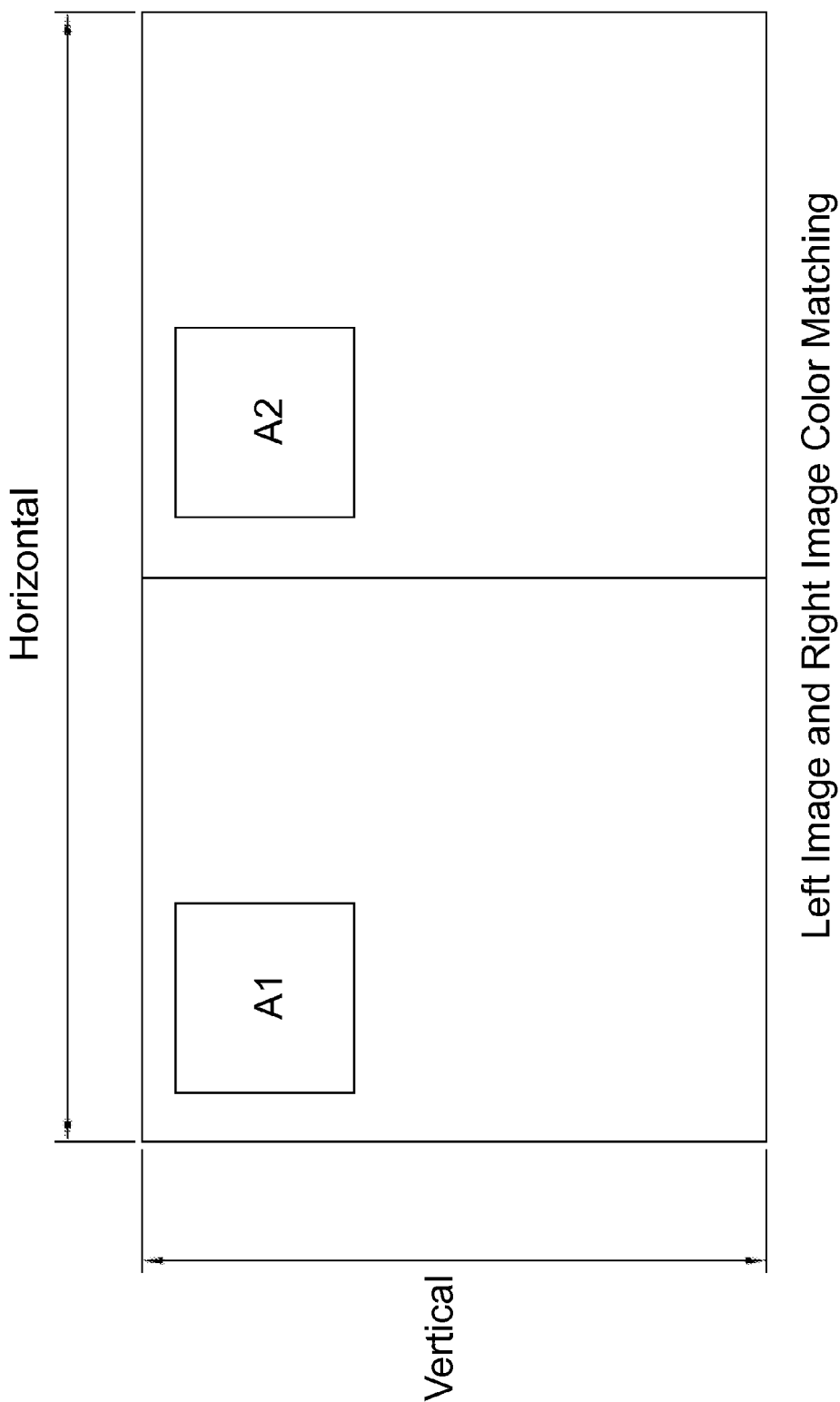
FIG. 4 shows a schematic diagram of an image that is presented in a side-by-side format in the form of a stereoscopic left and right image pair, wherein, in comparison with FIG. 3, the A1 and A2 pixel subset regions are different and is to present that the auto-detection software can use different regions to determine whether the image is indeed a stereoscopic image.

In use, the recording and playback device 20 loads the playback data 23, and starts the auto-detection software 210 built-in the recording and playback device 20. The playback data 23 is split into left and right regions (also being able to be split into upper and lower regions, but the split way is not limited by the previously mentioned) via the auto-detection software 210, and the left and right images are then processed for scope selection via the stereo-matching algorithm. With reference to FIGS. 3 and 4, a scope A1 is selected from the left region and a scope A2 is selected from the right region, and the selected scope A1 of the left region and the selected scope A2 of the right region are then processed under stereo-matching image processing algorithms to determine whether the image is of a stereoscopic format. In this embodiment, the stereo-matching image processing algorithms are to be performed once per second, but the performing period is not limited as previously mentioned. If a processed result of the selected scope A1 from the left region and the selected scope A2 from the right region under the stereo matching image processing algorithms is conformed thereto, the playback data 23 is then determined to be a 3D stereo format content. The playback data 23 is further integrally processed (i.e. imaging operations) via the graphics processing unit 22, and is transmitted to the data storage module 24 for saving and to the display device 10 via an image data transmission cable conformed to the communication protocols of the display device 10 for playing. Furthermore, the recording and playback device 20 transmits a signal to the display mode control chip 11 of the display device 10 in order to place the display device 10 into the 3D display mode thereof. As a result, users simply need to load a playback data 23 in the recording and playback device 20 and to start the auto-detection software 210 built-in the recording and playback device 20 in order to watch 3D images or videos conveniently. The display system for automatic detection and switching of 2D/3D display modes thereof in accordance with the present invention can indeed significantly enhance convenience of use, and can be widely accepted by the public.

In summary, the display system for automatic detection and switch of 2D/3D display modes thereof in accordance with the present invention is characterized as the following. The display device 10 comprises a built-in display mode control chip 11, and the recording and playback device 20 is electrically connected to the display device 10. The recording and playback device 20 comprises a built-in auto-detection software 210. A playback data 23 is firstly loaded by the recording and playback device 20, and is compared by the auto-detection software 210. The recording and playback device 20 then transmits a signal to the display mode control chip 11 of the display device 10 to achieve advantages of automatic detection and switch of 2D/3D display modes of the display device 10.

Described above is based on using the principle of stereoscopic display systems supporting the side-by-side format, and this is only used for explanation and description of a preferred embodiment of the present invention. Where those skilled in this art can make all sorts of other change or improvements based on the above description, the changes or improvements are still covered within the inventive spirit of the present invention and the scope as defined in the following claims.

What is claimed is:

1. A display system for automatic detection and switch of two-dimensional and three-dimensional (2D and 3D) display modes thereof, comprising:
   a display device comprising of a built-in display mode control chip that is an integrated circuit (IC) capable of controlling the display modes of the display system; and
   a recording and playback device electrically connected to the display device, and comprising a central processing unit and a graphics-processing unit, the central processing unit being electrically connected to the graphics-processing unit, and the central processing unit comprises a built-in auto-detection software, the auto-detection software being constructed by a stereo-matching image processing algorithm and a communication protocol, the recording and playback device loading a playback data to be compared by the auto-detection software, and transmits a signal to the display mode control chip of the display device, the stereo-matching image processing algorithms are to be performed once per second during processing of the auto-detection software.

2. The display system for automatic detection and switch of 2D and 3D display modes thereof as claimed in claim 1, wherein the display device is selected from one of a liquid crystal display, a plasma display panel and an organic light-emitting diode display.

3. The display system for automatic detection and switch of 2D and 3D display modes thereof as claimed in claim 1, wherein the recording and playback device is selected from one of a computer, a multimedia player, a smart phone, a tablet PC, and a digital camcorder (DV).

4. The display system for automatic detection and switch of 2D and 3D display modes thereof as claimed in claim 1, wherein the playback data is an image file or a graphic video file.

5. The display system for automatic detection and switch of 2D and 3D display modes thereof as claimed in claim 1, wherein the central processing unit is equipped with or connected to a data storage module, the playback data is read by the graphics-processing unit and the central processing unit and then sent to the auto-detection software for image processing to determine whether the playback data is a stereoscopic image and/or video.

6. The display system for automatic detection and switch of 2D and 3D display modes thereof as claimed in claim 1, wherein the auto-detection software compares the playback data via the stereo-matching image processing algorithm, and transmits the signal to the display mode control chip of the display device via the communication protocol.

7. The display system for automatic detection and switch of 2D and 3D display modes thereof as claimed in claim 1, wherein when the auto-detection software compares the playback data to determine the playback data to be a 3D stereo format content, the auto-detection software transmits the signal to the display mode control chip of the display device in order to place the display device into a 3D display mode thereof.

8. The display system for automatic detection and switch of 2D and 3D display modes thereof as claimed in claim 1, wherein when the auto-detection software compares the playback data to determine the playback data to be a 2D plane format content, the auto-detection software transmits the signal to the display mode control chip of the display device in order to place the display device into a 2D display mode thereof.

9. The display system for automatic detection and switch of 2D and 3D display modes thereof as claimed in claim 1, wherein the auto-detection software splits the playback data into two regions, and selects a scope sized smaller than each of the two split regions from one region of the two split regions and a corresponding scope sized smaller than the each of the two split regions from the other region of the two split regions for comparison, the stereo-matching image processing algorithm is applied on the selected scopes of the two split regions rather than the two split regions themselves.

10. A display system for automatic detection and switch of two-dimensional and three-dimensional (2D and 3D) display modes thereof, comprising:
   a display device comprising of a built-in display mode control chip that is an integrated circuit (IC) capable of controlling the display modes of the display system; and
   a recording and playback device electrically connected to the display device, and comprising a central processing unit and a graphics-processing unit, the central processing unit being electrically connected to the graphics-processing unit, and the central processing unit comprises a built-in auto-detection software, the auto-detection software being constructed by a stereo-matching image processing algorithm and a communication protocol, the recording and playback device loading a playback data to be compared by the auto-detection software, and transmits a signal to the display mode control chip of the display device, wherein the auto-detection software splits the playback data into two regions, and selects a scope sized smaller than each of the two split regions from one region of the two split regions and a corresponding scope sized smaller than the each of the two split regions from the other region of the two split regions for comparison, the stereo-matching image processing algorithm is applied on the selected scopes of the two split regions rather than the two split regions themselves.

* * * * *